United States Patent [19]

Haygood et al.

[11] Patent Number: 4,750,962

[45] Date of Patent: Jun. 14, 1988

[54] METHOD OF PICKING UP AND PLACING GEL MATERIAL

[75] Inventors: David Haygood, Sunnyvale; Chet Sandberg, Palo Alto; Paul G. Schoenstein, Redwood City, all of Calif.

[73] Assignee: Raychem Corporation, Menlo Park, Calif.

[21] Appl. No.: 1,121

[22] Filed: Jan. 7, 1987

[51] Int. Cl.[4] .......................... B32B 31/10; B32B 31/18

[52] U.S. Cl. .................................... 156/249; 156/238; 156/256; 156/285; 156/344

[58] Field of Search ............... 156/238, 249, 344, 285, 156/256, 289; 426/503, 515; 427/208.6; 428/195

[56] References Cited

U.S. PATENT DOCUMENTS

| | | | |
|---|---|---|---|
| 3,741,786 | 6/1973 | Torrey | 156/344 X |
| 4,595,635 | 6/1986 | Dubrow et al. | 428/447 |
| 4,634,207 | 1/1987 | Debbaut | 339/116 C |
| 4,643,924 | 2/1987 | Uken et al. | 428/35 |
| 4,644,026 | 2/1987 | Shuman et al. | 156/344 X |
| 4,680,233 | 7/1987 | Camin et al. | 428/424 |
| 4,701,574 | 10/1987 | Shimirak et al. | 174/93 |

OTHER PUBLICATIONS

U.S. patent application Ser. No. 38,415, filed Apr. 9, 1987 by Debbaut.

U.S. patent application Ser. No. 54,138 filed May 12, 1987 by Uken.

U.S. patent application Ser. No. 901,971 filed Aug. 29, 1986 by Dubrow.

U.S. patent application Ser. No. 864,689 filed May 19, 1986 by Reed.

U.S. patent application Ser. No. 935,088 filed Nov. 24, 1986 by Dubrow et al.

U.S. patent application Ser. No. 801,018 filed Nov. 22, 1985 by Gamarra et al.

*Primary Examiner*—Robert A. Dawson

*Attorney, Agent, or Firm*—Herbert G. Burkard

[57] ABSTRACT

A method of picking up and placing a portion of gel material. The method includes obtaining a quantity of gel material having at least one tacky surface contacting a sheet of release paper, contacting a portion of the gel material with a mechanical means for peeling a portion of the gel material from the release paper, and finally peeling the portion of gel material from the release material.

12 Claims, 4 Drawing Sheets

METHOD OF PICKING UP AND PLACING GEL MATERIAL

FIELD OF THE INVENTION

This invention relates to the field of picking and placing devices and, more particularly, to those devices which are suitable for picking and placing a gel material.

BACKGROUND OF THE INVENTION

Various gel materials have been used to protect substrates from corrosion and to provide electrical insulation on certain electrical terminals and connectors to prevent electrical malfunction upon exposure to moisture. These gel materials have particular properties which make them suitable for such uses, including a cone penetration value (ASTM D-937-77) of about 100 to about 350 ($10^{1}$-mm) and an ultimate elongation value (ASTM D-412) of at least about 100%. These gel materials have been used in various articles which provide means for placing the gel on the substrate and holding the gel in place on the substrate. For example, such gel materials have been used in terminal lug protection caps for the telecommunication industries as shown in U.S. Ser. No. 504,000 filed June 13, 1983 now (U.S. Pat. No. 4,634,207); in crimp connectors as shown in U.S. Ser. No. 038,415 (which is a continuation of U.S. Ser. No. 756,559 now abandoned, which is a continuation of U.S. Ser. No. 507,433 filed June 23, 1983 now abandoned); in covers for metal articles as shown in U.S. Ser. No. 715,789 filed Mar. 25, 1985 (now abandoned); in thermoformed articles as shown in U.S. Ser. No. 730,699 filed May 2, 1985 (now U.S. Pat. No. 4,643,924), in splice case end seals as shown in U.S. Ser. No. 698,643 filed Feb. 6, 1985 (now abandoned) and U.S. Ser. No. 730,697 filed May 2, 1985 now U.S. Pat. No. 4,701,574, in tape forms as shown in U.S. Ser. No. 54,138 which is a continuation of U.S. Ser. No. 894,755 now abandoned, which is a continuation of U.S. Ser. No. 725,507 now abandoned, which is a continuation of U.S. Serial No. 507,435 filed June 26, 1983 now abandoned, Ser. No. 901,971 (which is a continuation of U.S. Ser. No. 711,119 filed Mar. 12, 1985 now abandoned, Ser. No. 730,692 filed May 2, 1985 (now U.S. Pat. No. 4,595,635) and Ser. No. 730,405 filed May 2, 1985 now U.S. Pat. No. 4,680,233) and in tape forms having a protective backing as shown in U.S. Ser. No. 864,689 filed May 19, 1986. The disclosures of the above applications, which are all commonly assigned with this application, are incorporated herein by reference.

The gel materials having the above properties have been applied to substrates by having the gel contained in a preformed shape which is placed on the substrate or having the gel on or in a flexible backing or support which is applied to the substrate as a sheet or tape material. The former requires that the preformed shape have an appropriate shape which corresponds to the substrate on which the gel is to be placed.

It is the latter, the sheet or tape gel articles, with which the present invention is concerned. Such articles are difficult to handle and apply and further require manual handling or touching to properly place them in position. Such an exercise can be very messy and time-consuming.

Devices for picking and placing sealing material, gaskets and the like are, of course, well-known. It is believed, however, that such devices would be unworkable with gel material.

The reason for this conclusion is based on the special nature of gel material. Whereas sealing material or gaskets may be tacky on one side (or not all), gel material is tacky over its entirety although certain surfaces may be less tacky than others. Thus, the tendency of the gel material is to adhere to the picking and placing device equally as well as to the substrate to which the gel material is to be applied. This makes application of the gel material to a substrate inconsistent at best.

Accordingly, the need has arisen for a device, and more particularly a method, for picking and placing a gel material.

Thus, an object of the invention is a method for picking and placing a gel material.

A further object of the invention is a method for picking and placing a gel material which is easy to use.

These and other objects of the invention will become more apparent after referring to the following description considered in conjunction with the accompanying drawings.

BRIEF SUMMARY OF THE INVENTION

Thus the objects of the invention have been achieved by providing a method of picking up and placing a portion of gel material. The method comprises obtaining a quantity of gel material having at least one tacky surface contacting a sheet of release paper, contacting a portion of the gel material with a mechanical means for peeling a portion of the gel material from the release paper, and finally peeling the portion of gel material from the release paper.

DETAILED DESCRIPTION OF THE INVENTION

According to a first aspect of the invention there is disclosed a method of picking up and placing a portion of gel material. The method comprises obtaining a quantity of gel material having at least one tacky surface contacting a sheet of release paper, contacting a portion of the gel material with a mechanical means for peeling the portion of gel material from the release paper and peeling the portion of gel material from the release paper.

Further steps of the invention may comprise placing the portion of gel material on or over a substrate and then removing the peeling means from contact with the gel material.

As indicated above, gel material is very difficult to dispense in any kind of an automated manner due to the fact that the gel material is very tacky and thus will adhere equally as well to the dispensing apparatus and to the substrate. However, while gel material is tacky and will adhere very well to a substrate, it is also very weak in peel strength. Building upon this weakness in the peel strength, the present inventors have discovered several methods of picking and placing gel material in an efficient manner.

The method refers to the picking up and placing of a portion of gel material. It should be understood that "a portion" refers to a part of a continuous sheet or strip of gel material as well as to one or more individual gel articles from a sheet or strip containing a plurality of such gel articles.

According to another aspect of the invention there is disclosed a method of picking up and placing at least one strip of gel material. The method comprises obtaining a quantity of gel material comprising a plurality of strips of gel material, each strip having at least one tacky surface contacting a sheet of release paper. The method further comprises partially inserting a blade between at least one strip of gel material and the release paper and lifting the blade and at least one strip of gel material from the release paper. Further steps of the invention may comprise placing the at least one strip of gel material on or over a substrate and then removing the blade from contact with the gel material.

Referring to the Figures in more detail, and particularly referring to FIGS. 1–4, there is illustrated in schematic, the method of the invention.

Figure 1:
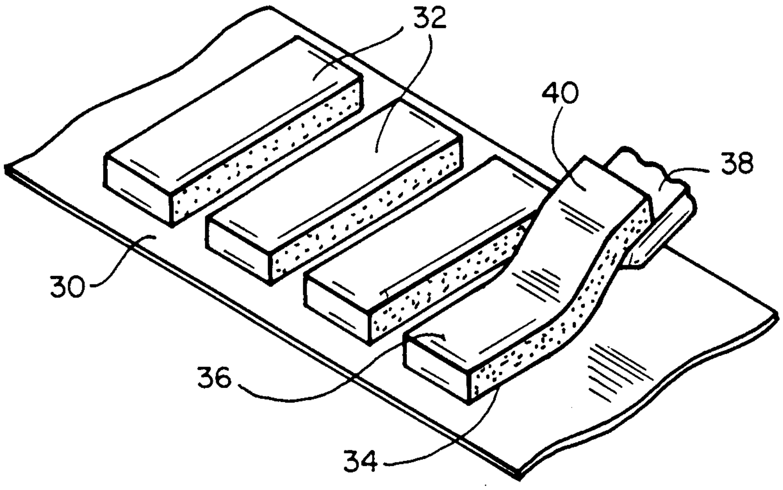
FIGS. 1–4 are schematical views illustrating a first method according to the invention.

Particularly referring to FIG. 1 there is shown a sheet of release paper 30 containing a plurality of strips of gel material 32. Each of the strips of gel material has at least one tacky surface 34 which is in contact with the sheet of release paper 30. Each of the gel strips may additionally have another tacky surface 36. It can be seen that a blade 38 is partially inserted between a strip of gel material 32 and the release paper 30. As shown in FIG. 1 the blade 38 is only wide enough to contact one strip of gel material. However, it is within the scope of the invention for the blade 38 to contact more than one strip of gel material 32. Once the blade has been inserted between the strip of gel material and release paper, the blade is then lifted from the release paper.

Figure 2:
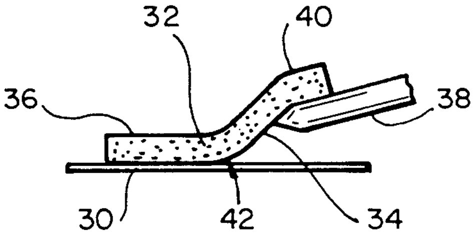

Referring now to FIG. 2, which is an end view of the strip of gel articles in FIG. 1, it can be seen that the lifting of the blade 38 and the end 40 of the strip of gel material 32 held by the blade causes the strip of gel material to be put into peel at 42. This makes lifting of the strip of gel material from the release paper very easy as the gel will adhere to the blade rather than to the release paper since the gel material is being put into peel.

Figure 3:
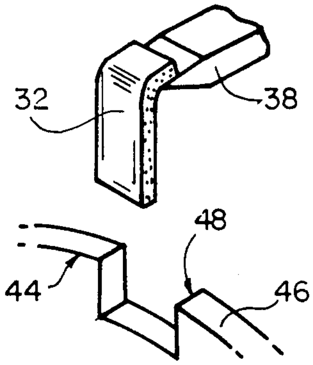
Figure 4:
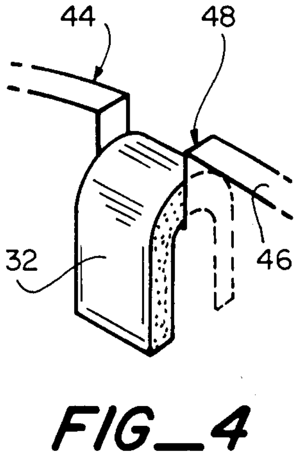

Referring now to FIGS. 3 and 4 once the strip of gel material 32 has been removed from the sheet of release paper 30 it may be carried over by the blade 38 to the substrate 44 on which the strip of gel material is to be placed. The strip of gel material 32 is then placed on or over the substrate, generally indicated by 44. As shown in FIGS. 3 and 4 the strip of gel material is draped over the substrate 44. However, this method would work just as well if the strip of gel material were to be placed upon a planar substrate. Once the strip of gel material has been placed on the substrate 44 as shown in FIGS. 3 and 4, the blade 38 may be removed from contact with the gel material. Again, taking advantage of the weak peel strength of the gel material the strip will adhere to the substrate 44 rather than to the blade as the blade is removed from contact with the gel material. Accordingly, the objects of the invention have been easily achieved with this method in a very effective and efficient manner.

While the method will work, of course, with many different types of substrates, one particular substrate with which the method is particularly effective is an electrical socket 46, a portion of which is shown in FIG. 3. The electrical socket 46 has a wire slot 48 where it is desired to place a strip of gel material 32. This strip of gel material 32 acts as a gasket or sealing means to prevent the ingress of moisture and other environmental contaminants. The strip of gel material 32 is simply placed in the slot 48 by the blade 38 and then the blade is removed.

According to the invention, there is further disclosed a method of picking up and placing at least one strip of gel material comprising obtaining a quantity of gel material comprising a plurality of strips of gel material contacting a sheet of release paper wherein the gel material has surface tack, and then contacting the at least one strip of gel material with a cylindrical mandrel. The method further comprises rolling the mandrel over the at least one strip of gel material until the gel material is substantially rolled onto the mandrel and then lifting the mandrel and the at least one strip of rolled gel material from the release paper.

The method may further comprise the steps of placing the mandrel and the at least one strip of rolled gel material onto a substrate and then rolling the mandrel and the at least one strip of rolled gel material over the substrate until the at least one strip of gel material is unrolled onto the substrate.

Figure 5:
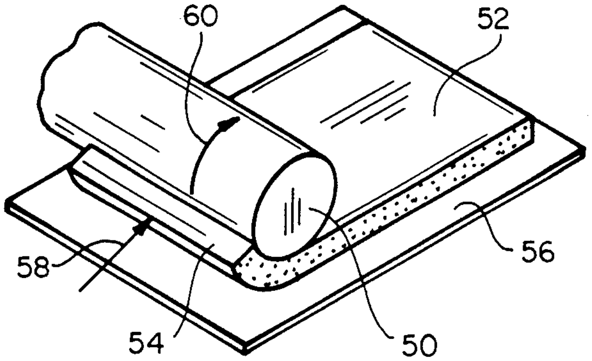
FIGS. 5–7 are schematical views illustrating another embodiment of the method according to the invention.
Figure 6:
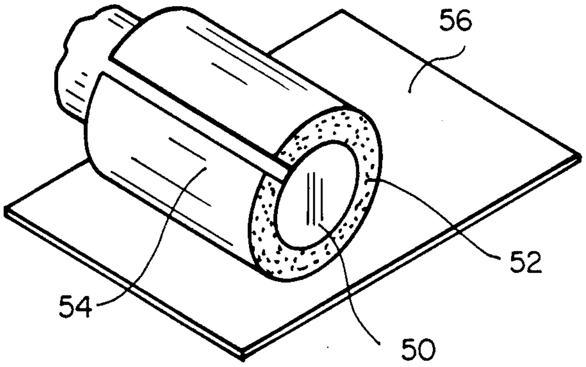
Figure 7:
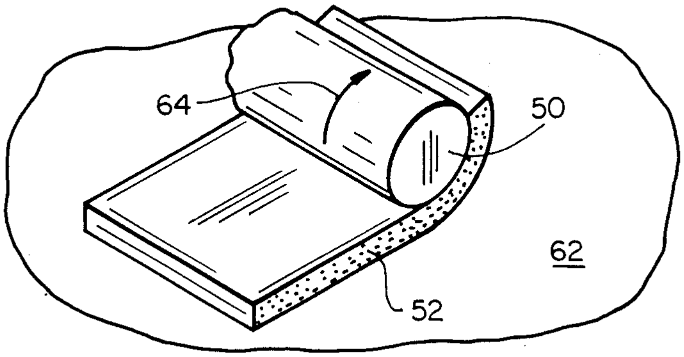

Referring now to FIGS. 5–7, and particularly referring to FIG. 5, a cylindrical mandrel 50 is made to contact one strip 52 of a plurality of such strips of gel material. As shown in FIGS. 5–7 there is only one strip of gel material 52. However, the cylindrical mandrel 50 could just as easily contact two or more strips of the gel material. In this embodiment of the invention it is necessary that the gel material have surface contact throughout so that the gel material will adhere to the mandrel as well as to a substrate as will become more apparent hereafter.

Once the mandrel 50 has contacted the strip of gel material 52 as shown in FIG. 5, the edge 54 of the strip of gel material may be lifted from the sheet of release paper 56 in some manner, schematically illustrated by arrow 58. While not shown, there may be a helper blade which is partially inserted under the edge of the strip of gel material, for example as shown in the previous embodiment of FIGS. 1–4.

Additionally the release paper 56 may be perforated under the edge 54 so that an air jet or some other fluid medium could be flushed through the perforations to aid in the uplifting of the edge of the gel material. Once the edge of the strip of gel material has been lifted into contact with the mandrel, the gel material will adhere to the mandrel 50 rather than to the release paper 56 as the strip of gel material is put into peel. Then upon rolling 60 the mandrel 50 over the strip of gel material 52 the gel material 52 will become substantially or entirely rolled onto the mandrel 50 as shown in FIG. 6. The mandrel 50 and the rolled strip of gel material 52 may then be lifted from the sheet of release paper 52. Alternatively, the mandrel and strip of rolled gel material may be rolled off the release paper. In this latter step, all that need be done is to continue the rolling of the mandrel and gel material until both are no longer in contact with the release paper.

Once the gel material 52 and mandrel 50 have been completely removed from the release paper 56, the mandrel 50 and rolled strip of gel material 52 may then be moved to, and placed onto, the desired substrate 62 to which the strip of gel material is to be adhered. At this point, the gel material 52 will readily adhere to the substrate 62. The mandrel 50 is then rolled in the direction of the arrow 64 shown in FIG. 7 until the strip of gel material 52 is completely unrolled onto the substrate 62. It may be found desirable to peel an edge of the gel material from the mandrel (such as by a helper blade) and place it in contact with the substrate so as to more readily initiate the peeling of the gel material as it unrolls from the mandrel. Again, this step of rolling the mandrel takes advantage of the weak peel strength of the gel material. Accordingly, the gel material 52 will adhere to the substrate 62 rather than to the mandrel 50. Once the strip of gel material 52 has been completely unrolled from the mandrel 50, the mandrel 50 may then be removed.

According to a final aspect of the invention there is disclosed a method of picking up and placing a portion of gel material comprising obtaining a sheet of gel material having at least one tacky surface contacting a sheet of release paper, contacting a portion of the gel material with a cutting and pressurizing apparatus and then cutting the portion of gel material. The method further comprises exerting a vacuum force through the cutting and pressurizing apparatus against the portion of gel material and then removing the portion of gel material from the release sheet by lifting the cutting and pressurizing apparatus and the portion of gel material in such a manner that the portion of gel material is peeled from the release sheet. The portion of gel material is held in the cutting and pressurizing apparatus by the vacuum force.

The method according to the invention may further comprise placing the portion of gel material and the cutting and pressurizing apparatus on or over a substrate, exerting a positive pressure force through the cutting and pressurizing apparatus against the portion of the gel material so that the portion of gel material is released from th cutting and pressurizing apparatus and then finally removing the cutting and pressurizing apparatus from contact with the portion of gel material.

Figure 8:
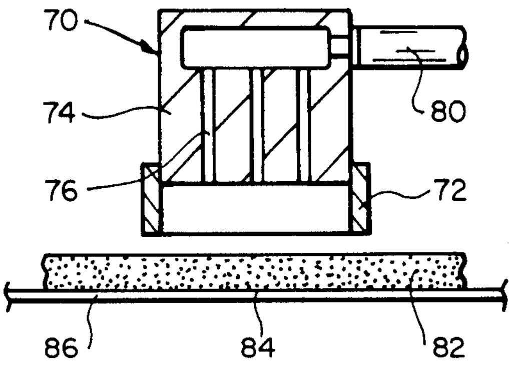
FIGS. 8–13 are schematical views illustrating a final embodiment of the method according to the invention.

Referring to FIGS. 8–13 there is illustrated in schematic this embodiment of the method of the invention. In FIG. 8 there is shown a cross-sectional view of the cutting and pressurizing apparatus, generally indicated by 70, which is found to be particularly useful with this embodiment of the invention. The apparatus 70 comprises a cutting portion 72 which is joined to a vacuum block 74, which has cavities 76 for pulling a vacuum or for introducing a pressurized fluid, preferably air. The vacuum is pulled or a pressurized fluid is introduced through hose 80. This method of the invention may be used with a strip of gel articles or as shown in FIGS. 8–13 may be used with a sheet of gel material 82 contacting a sheet of release paper 86. This particular method of the invention has the advantage that a predetermined shape of gel material may be cut from a continuous sheet of gel material. As shown in the Figures the shape to be cut is rectangular, but other shapes, of course, are contemplated within the scope of the invention. For the invention to be effective, it is necessary only that one surface 84 of the gel material 82 be tacky. The reason for this will become apparent hereafter. As shown in FIG. 8, the apparatus 70 is placed in proximity to the sheet of gel material 82.

Figure 9:
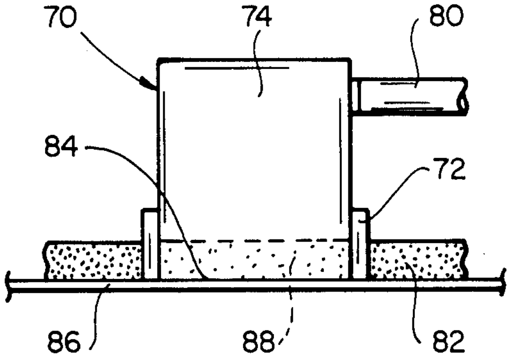
Figure 10:
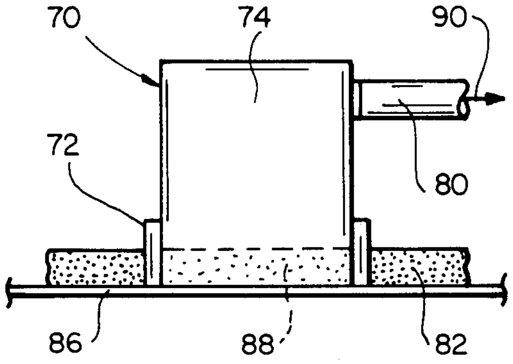

Referring now to FIG. 9 the cutting and pressurizing apparatus 70 is in contact with the sheet of gel material. The cutting portion 72 of the apparatus 70 has cut a portion 88 of the gel material 88 in a pre-determined shape. A vacuum force is then exerted against the portion of gel material 88 through the cutting and pressurizing apparatus 70. This vacuum force is schematically illustrated by arrow 90 shown in FIG. 10. The portion of gel material 88 is now ready to be removed from the sheet of release paper 86.

Figure 11:
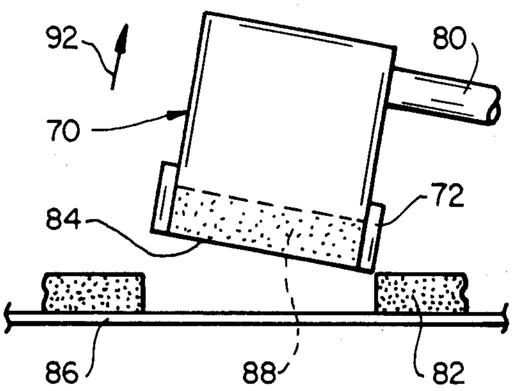

The portion of gel material 88 is removed from the release sheet 86 as shown in FIG. 11 by lifting the cutting and pressurizing apparatus 70 and the portion of gel material 88 in such a manner that the portion of gel material 88 is peeled from the release sheet 86. The gel material may be put into peel by rotating the cutting and pressurizing apparatus 70 as indicated by the arrow 92 shown in FIG. 11 rather than lifting the apparatus and gel material straight up. Again, since the gel material is put into peel, it will more readily adhere to the apparatus 70 rather than to the sheet of release paper 86. The portion of gel material 88 is held in the cutting and pressurizing apparatus 70 by the vacuum force 90.

Once the portion of gel material 88 has been removed from the sheet of release paper 86, the gel material 88 may be placed wherever it is desired.

Figure 12:
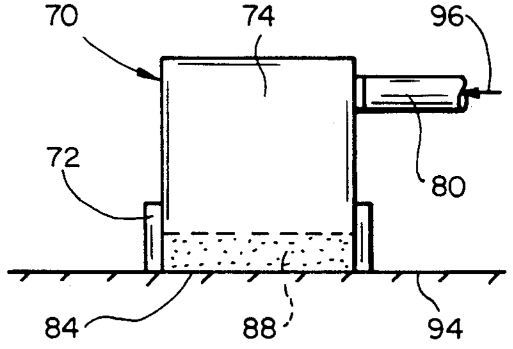

As shown in FIG. 12 the portion of gel material 88 and the apparatus 70 have been placed on a substrate 94. Once the gel material 88 and the apparatus 70 have been placed in position, the vacuum is released and a positive pressure force, schematically indicated by arrow 96, is exerted against the portion of gel material 88 through the cutting and pressurizing apparatus 70. This positive pressure force 96 is simply a pressurized fluid medium such as pressurized air or inert gas. Then the positive pressure force in conjunction with the adherence of tacky surface 84 of the gel material 88 to the substrate 94 will cause the portion of gel material 88 to be released from the cutting and pressurizing apparatus 70 and adhered to the substrate 94.

Figure 13:
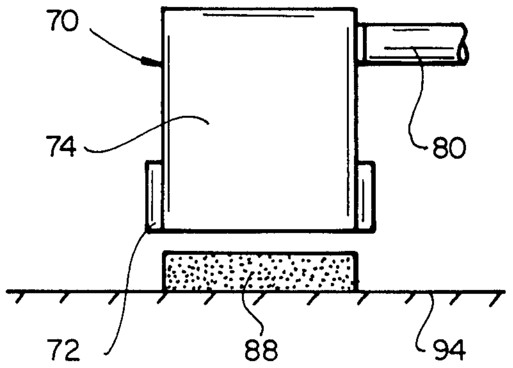

A final step in the method is removing the cutting and pressurizing apparatus 70 from contact with the portion of gel material 88 as shown in FIG. 13. The portion of gel material 88 has thus been placed in the desired position and the objects of the invention have been effectively and efficiently achieved.

The gel material useful in the present invention include the polyurethane, silicone and other gels described in the patent applications referred to above in the Background section of this specification. Other gels which are particularly useful in the present invention are the silicone gels described in U.S. Ser. No. 935,088 which is a continuation of Ser. No. 730,402 filed May 2, 1985 now abandoned and the styrene-dienne block copolymer gels described in U.S. Ser. No. 801,018 filed Nov. 22, 1985, the disclosures of which are incorporated herein by reference.

Although the various patent applications referred to describe various compositions useful in the present invention, it is important to note that the type of material or chemical composition of the gel material is in general not as important as the particular physical properties of the gel which make it useful in providing the desired protection for the substrate. The physical properties which are important for the gel material are the cone penetration in the range of about 100 to about 350 ($10^{-1}$ mm) and the ultimate elongation of at least 100%. Gels having these properties have sufficient conformability to conform to various shapes and irregularities in the surfaces of various substrates. It is desirable in many uses that the gel also have a relatively high surface tack to form a good seal with the surface of a substrate and have sufficient tensile strength to withstand being applied to and conforming to the shape of a substrate without tearing. The gel material may be made from different chemical compositions than the polyurethanes, polysiloxanes, styrene-dienne block copolymers, and the like as disclosed in the above referenced patent applications, provided that the material has the specified cone penetration and ultimate elongation properties which make the gel material particularly suitable for conforming to and providing environmental protection for a substrate surface.

The gels useful in the present invention provide excellent sealing properties for excluding water and other contaminants from the surface of various substrates. Due to the cone penetration and ultimate elongation properties of the gel materials, they not only conform well to the surface of the substrate to provide the necessary sealing but also have the property of being readily reenterable, i.e. easily removeable, when it is desired to have access to the surface of the substrate. In many applications the same gel material may be reinstalled on the same substrate after it is removed, thus providing the convenience of having the substrate protected but also having it accessible for service, inspection or other purposes.

The gels useful in the present invention in general have a cone penetration value from about 100 to about 350 ($10^{-1}$ mm). In many uses it is preferred that the gel have a cone penetration between about 150 and 350 and in some applications it is preferred that the cone penetration be between about 100 and about 300. The gels when used in relatively thin layers with appropriate covering layer may provide superior surface protection and sealing when the cone penetration is between about 250 and about 350. The ultimate elongation of the gel material should be at least 100% in order to provide good conformability with the surface of the substrate. Higher values are generally preferred in order to provide better sealing of the gel material to the surface of the substrate. It is generally preferred that the gel material have an elongation of at least 200% and in many applications an elongation of at least 500% is desired. In other applications it is preferred that the gel material have an elongation of at least 750%.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A method of picking up and placing a portion of gel material, comprising:

obtaining a quantity of gel material having a cone penetration of about 100 to about 350 ($10^{-1}$ mm) and an ultimate elongation of at least about 100%, and at least one tacky surface in contact with a sheet of release paper;

contacting a portion of the gel material with a mechanical means for peeling the portion of gel material from the release paper; and peeling the portion of gel material from the release paper.

2. The method of claim 1 further comprising the steps of:

placing the portion of gel material on or over a substrate; and removing the peeling means from contact with the gel material.

3. A method of picking up and placing at least one strip of gel material, comprising:

obtaining a quanitity of gel material comprising a plurality of strips of gel material, each strip having at least one tacky surface contacting a sheet of release paper;

partially inserting a blade between at least one strip of gel material and the release paper; and lifting the blade and the at least one strip of gel material from the release paper.

4. The method of claim 3 further comprising the steps of:

placing the at least one strip of gel material on or over a substrate; and removing the blade from contact with the gel material.

5. The method of claim 4 further comprising a substrate, the substrate being an electrical socket having a wire slot, wherein the strip of gel material is placed in the slot.

6. The method of claim 4 wherein the gel material comprises a material having a cone penetration of about 100 to about 350 ($10^{-1}$ mm) and an ultimate elongation of at least about 100%.

7. A method of picking up and placing at least one strip of gel material comprising:

obtaining a quantity of gel material comprising a plurality of strips of gel material contacting a sheet of release paper, the gel material having surface tack;

contacting the at least one strip of gel material with a cylindrical mandrel;

rolling the mandrel over the at least one strip of gel material until the gel material is substantially rolled onto the mandrel; and removing the mandrel and the at least one strip of rolled gel material from the release paper.

8. The method of claim 7 further comprising the steps of:

placing the mandrel and the at least one strip of rolled gel material onto a substrate; and rolling the mandrel and the at least one strip of rolled gel material over the substrate until the at least one strip of gel material is unrolled onto the substrate.

9. The method of claim 8 wherein the gel material comprises a material having a cone penetration of about 100 to about 350 ($10^{-1}$ mm) and an ultimate elongation of at least about 100%.

10. A method of picking up and placing a portion of gel material comprising:

obtaining a sheet of gel material having at least one tacky surface contacting a sheet of release paper;

contacting a portion of the gel material with a cutting and pressurizing apparatus;

cutting the portion of gel material;

exerting a vacuum force through the cutting and pressurizing apparatus against the portion of gel material; and removing the portion of gel material from the release sheet by lifting the cutting and pressurizing apparatus and the portion of gel material in such a manner that the portion of gel material is peeled from the release sheet, wherein the portion of gel material is held in the cutting and pressurizing apparatus by the vacuum force.

11. The method of claim 10 further comprising the steps of:

placing the portion of gel material and the cutting and pressurizing apparatus on or over a substrate;

exerting a positive pressure force through the cutting and pressurizing apparatus against the portion of gel material so that the portion of gel material is released from the cutting and pressurizing apparatus; and removing the cutting and pressurizing apparatus from contact with the portion of gel material.

12. The device of claim 11 wherein the gel material comprises a material having a cone penetration of about 100 to about 350 ($10^{-1}$ mm) and an ultimate elongation of at least about 100%.

* * * * *